United States Patent
Imai

(10) Patent No.: US 8,677,735 B2
(45) Date of Patent: Mar. 25, 2014

(54) EXHAUST PURIFICATION SYSTEM OF INTERNAL COMBUSTION ENGINE

(75) Inventor: Daichi Imai, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/519,765

(22) PCT Filed: Dec. 28, 2009

(86) PCT No.: PCT/JP2009/071922
§ 371 (c)(1),
(2), (4) Date: Jun. 28, 2012

(87) PCT Pub. No.: WO2011/080845
PCT Pub. Date: Jul. 7, 2011

(65) Prior Publication Data
US 2012/0294770 A1   Nov. 22, 2012

(51) Int. Cl.
*F01N 3/00* (2006.01)
*F01N 3/10* (2006.01)

(52) U.S. Cl.
USPC .............................. 60/285; 60/301

(58) Field of Classification Search
USPC .......................... 60/285, 295, 301
See application file for complete search history.

(56) References Cited

U.S. PATENT DOCUMENTS

| 6,199,372 | B1 | 3/2001 | Wakamoto | |
| 6,497,092 | B1 * | 12/2002 | Theis | 60/274 |
| 2004/0028587 | A1 | 2/2004 | Twigg | |
| 2010/0139259 | A1 * | 6/2010 | Hirota et al. | 60/301 |

FOREIGN PATENT DOCUMENTS

| CN | 101541402 A | 9/2009 |
| JP | 2801423 | 10/1992 |
| JP | 9 248448 | 9/1997 |
| JP | 2003 536012 | 12/2003 |
| JP | 2007 38145 | 2/2007 |
| JP | 2009 47095 | 3/2009 |
| JP | 2009 112967 | 5/2009 |
| WO | 97 41336 | 11/1997 |

OTHER PUBLICATIONS

International Search Report Issued Mar. 9, 2010 in PCT/JP09/71922 Filed Dec. 28, 2009.

* cited by examiner

*Primary Examiner* — Audrey K Bradley
(74) *Attorney, Agent, or Firm* — Oblon, Spivak, McClelland, Maier & Neustadt, L.L.P.

(57) ABSTRACT

A control device of an internal combustion engine is provided. A silver-alumina based catalyst device is arranged in an engine exhaust system, and an exhaust gas air-fuel ratio in the catalyst device is made rich to restore the $NO_X$ adsorption ability of the catalyst device.

4 Claims, 3 Drawing Sheets

FLOW OF EXHAUST GAS

Fig.1
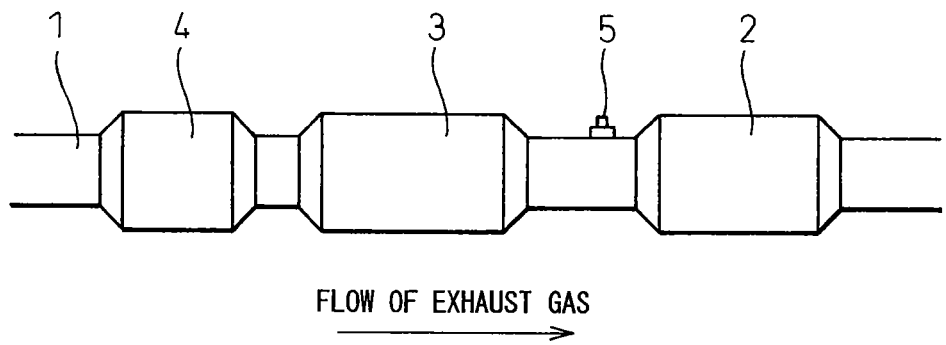
FLOW OF EXHAUST GAS →
Fig.2
(A) 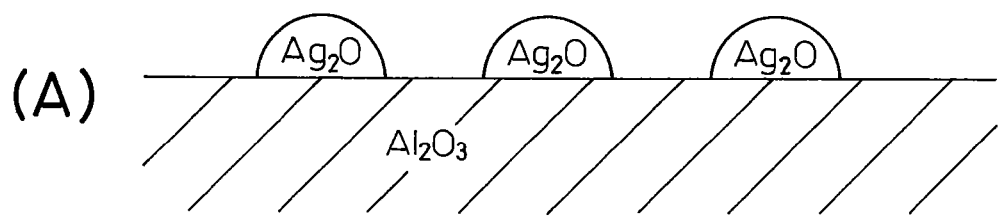
(B) 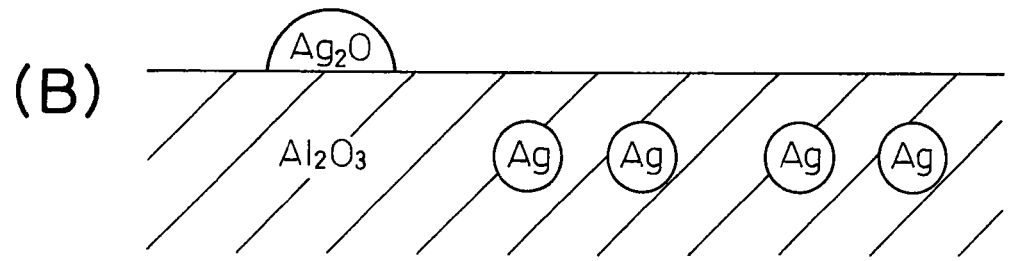

EXHAUST PURIFICATION SYSTEM OF INTERNAL COMBUSTION ENGINE

TECHNICAL FIELD

The present invention relates to an exhaust purification system of an internal combustion engine.

BACKGROUND ART

Known in the art is a catalyst device which uses alumina as a carrier coating material and carries silver oxide (refer to Japanese Patent No. 2801423 and Japanese Unexamined Patent Publication No. 2007-38145). Such a catalyst device functions to adsorb $NO_X$ at the time of a low temperature and to release the adsorbed $NO_X$ at the time of a high temperature.

DISCLOSURE OF THE INVENTION

In the above-mentioned such silver-alumina based catalyst device, sometimes the silver forms a solid solution in the alumina and therefore the $NO_X$ adsorption ability for adsorbing $NO_X$ drops.

Therefore, an object of the present invention is to provide an exhaust purification system of an internal combustion engine where a silver-alumina based catalyst device is arranged in an engine exhaust system which restores a dropped $NO_X$ adsorption ability of the silver-alumina based catalyst device.

An exhaust purification system of an internal combustion engine in accordance with a first aspect of the present invention is provided, wherein a silver-alumina based catalyst device is arranged in an engine exhaust system and by making an exhaust gas air-fuel ratio in the catalyst device rich so as to restore an $NO_X$ adsorption ability of the catalyst device when adsorption ability of the catalyst device becomes a set ability or less, and judging that the $NO_X$ adsorption ability of the catalyst device has fallen to the set ability when a total of the time when the temperature of the catalyst device becomes a set temperature or more becomes a set time.

An exhaust purification system of an internal combustion engine as set forth in claim 2 according to the present invention is provided as the exhaust purification system of an internal combustion engine as set forth in claim 1 characterized by restoring the $NO_X$ adsorption ability of the catalyst device when the $NO_X$ adsorption ability of the catalyst device becomes a set ability or less.

An exhaust purification system of an internal combustion engine as set forth in claim 3 according to the present invention is provided as the exhaust purification system of an internal combustion engine as set forth in claim 2 characterized by judging that the $NO_X$ adsorption ability of the catalyst device has fallen to the set ability when a total of the time when the temperature of the catalyst device becomes a set temperature or more becomes a set time.

An exhaust purification system of an internal combustion engine in accordance with a second aspect of the present invention is provided, wherein a silver-alumina based catalyst device is arranged in an engine exhaust system, making an exhaust as air-fuel ratio in the catalyst device rich so as to restore an $NO_X$ adsorption ability of the catalyst device when the $NO_X$ adsorption ability of the catalyst device becomes a set ability or less, and judging that the $NO_X$ adsorption ability of the catalyst device has fallen to the set ability when a cumulative value of a temperature difference between a temperature of the catalyst device for a unit time and a set temperature becomes a set cumulative value when the temperature difference is positive.

An exhaust purification system of an internal combustion engine in accordance with a third aspect of the present invention is provided, when the $NO_X$ adsorption ability of the catalyst device has become the set ability and it is not possible to make an air-fuel ratio of exhaust gas which flows into the catalyst device rich at that time due to other demands, the system makes a greater amount of reducing substance than a predetermined amount flow into the catalyst device when there are no longer other demands and making an air-fuel ratio of exhaust gas which flows into the catalyst device rich.

According to the exhaust purification system of an internal combustion engine in accordance with the first aspect of the present invention, when the silver-alumina based catalyst device which is arranged in the engine exhaust system becomes a set temperature or more, the silver forms a solid solution in the alumina and the $NO_X$ adsorption ability falls, but the air-fuel ratio of the exhaust gas in the catalyst device is made rich so that the reducing substance in the exhaust gas acts on the alumina and the silver is restored from the solid solution state, so the $NO_X$ adsorption ability can be restored.

Further, when the $NO_X$ adsorption ability of the catalyst device becomes the set ability or less, the $NO_X$ adsorption ability of the catalyst device is restored. Therefore, the air-fuel ratio of the exhaust gas in the catalyst device is not made rich to restore the $NO_X$ adsorption ability when the $NO_X$ adsorption ability of the catalyst device exceeds the set ability. Thus, it is possible to suppress deterioration of the fuel consumption.

Further, since the longer the time the temperature of the catalyst device becomes the set temperature or more, the more the $NO_X$ adsorption ability of the catalyst device falls, it is judged that the $NO_X$ adsorption ability of the catalyst device has fallen to the set ability when a total of that time becomes a set time. Due to this, it is possible to relatively accurately judge that the $NO_X$ adsorption ability has fallen to the set ability.

According to the exhaust purification system of internal combustion engine as set forth in claim 4 of the present invention, the $NO_X$ adsorption ability of the catalyst device is restored when the $NO_X$ adsorption ability of the catalyst becomes the set ability or less since the $NO_X$ adsorption ability of the catalyst device falls when the temperature difference between the temperature of the catalyst each unit time and the set temperature is positive and the larger the temperature difference, the greater the amount of drop of the $NO_X$ adsorption ability per unit time of the catalyst device, it is judged that the $NO_X$ adsorption ability of the catalyst device has fallen to the set ability when the cumulative value of the temperature difference becomes the set cumulative value. Due to this, it is possible to judge relatively accurately that the $NO_X$ adsorption ability has fallen to the set ability.

According to the exhaust purification system of an internal combustion engine in accordance with the third aspect of the present invention, when the $NO_X$ adsorption ability of the catalyst device becomes the set ability and, at that time, the air-fuel ratio of the exhaust gas which flows into the catalyst device cannot be made rich due to other demands, when there are no longer other demands and the air-fuel ratio of the exhaust gas which flows into the catalyst device is made rich, the rich time is extended, a smaller rich air-fuel ratio is set, etc. to cause a greater amount of reducing substance than a predetermined amount to flow into the catalyst device. Due to this, the formation of a solid solution by silver proceeds and the $NO_X$ adsorption ability falls further until the air-fuel ratio of the exhaust gas which flows into the catalyst device is made rich, but a sufficient amount of silver is restored from the solid solution state by the greater amount of the reducing substance and the $NO_X$ adsorption ability can be sufficiently restored.

BRIEF DESCRIPTION OF DRAWINGS

FIG. 1 is a schematic view which shows an exhaust purification system of an internal combustion engine according to the present invention.

FIG. 2 is a view for explaining formation of a solid solution by silver in an $NO_X$ catalyst device wherein (A) shows the state before formation of a solid solution and (B) shows the state after formation of the solid solution.

DESCRIPTION OF EMBODIMENTS

Figure 3:
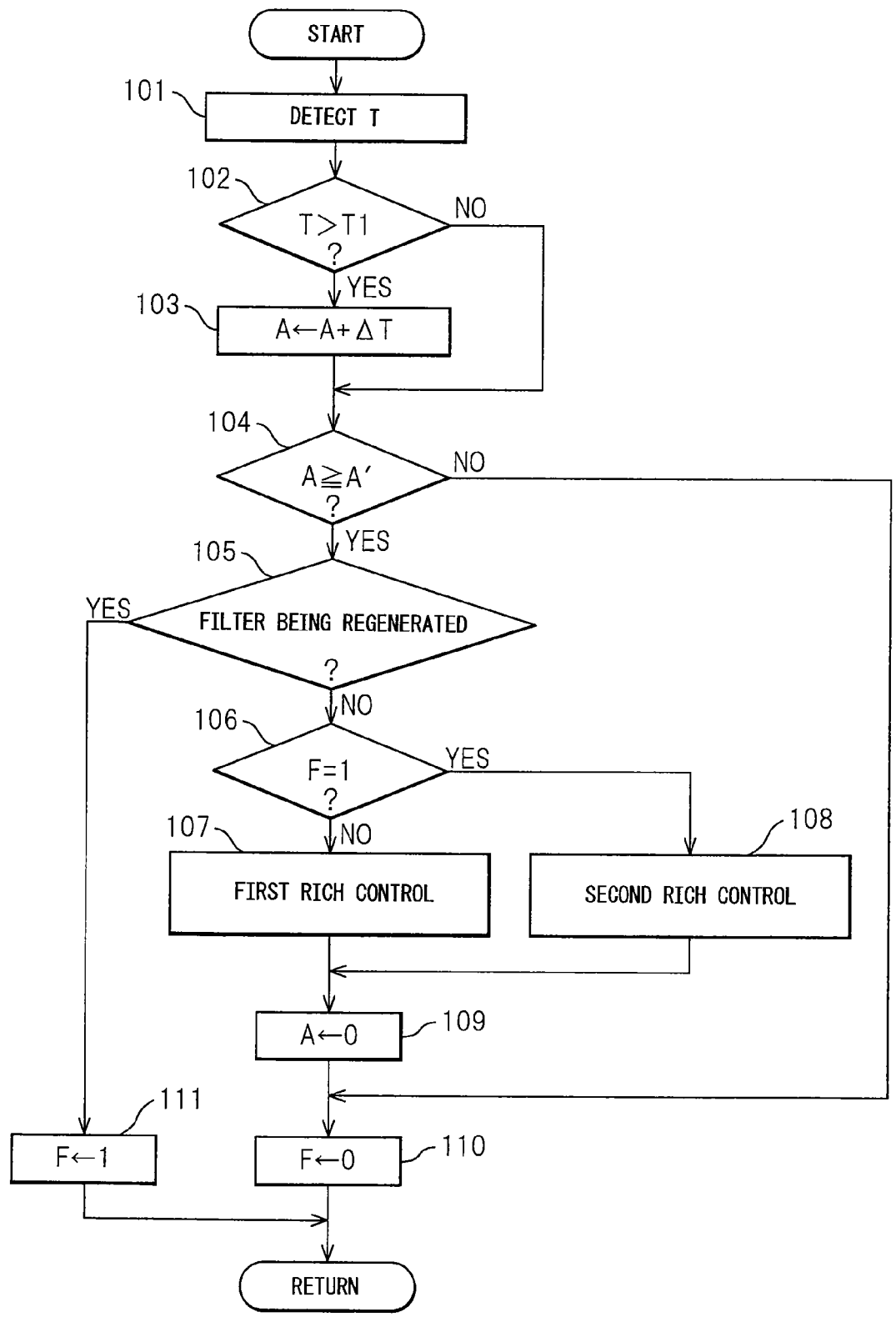
FIG. 3 is a flow chart for restoration of the $NO_X$ adsorption ability of the $NO_X$ catalyst device performed in an exhaust purification system according to the present invention.

FIG. 1 is a schematic view which shows an exhaust purification system of an internal combustion engine according to the present invention. In that figure, 1 indicates an exhaust passage of the internal combustion engine. The internal combustion engine is an internal combustion engine which carries out lean combustion like a diesel engine or direct fuel injection-type spark-ignition internal combustion engine. The exhaust gas of such an internal combustion engine contains a relatively large amount of $NO_X$, so the exhaust passage 1 has an $NO_X$ catalyst device 2 which adsorbs $NO_X$ arranged in it.

The $NO_X$ catalyst device 2 is a silver-alumina based catalyst device which uses alumina as a carrier coating material and carries silver oxide. It can adsorb the $NO_X$ in the exhaust gas as silver nitrate at the time of a low temperature and releases the adsorbed $NO_X$ when becoming a high temperature (500° C. or more). The released $NO_X$, for example, can be purified by reduction at an $NO_X$ reducing catalyst arranged at the downstream side of the $NO_X$ catalyst device 2 by using a reducing substance supplied to the upstream side or downstream side of the $NO_X$ catalyst device 2 in accordance with need.

Reference numeral 3 is a particulate filter for trapping particulate in the exhaust gas and is arranged at an upstream side of the $NO_X$ catalyst device 2. Reference numeral 4 is an oxidation catalyst device for purification of exhaust gas by oxidation of the HC and CO etc. which is arranged at the immediate upstream side of the particulate filter 3. Reference numeral 5 is a temperature sensor for measuring the temperature of exhaust gas which flows into the $NO_X$ catalyst device 2 as the temperature of the $NO_X$ catalyst device 2.

The $NO_X$ catalyst device 2, for example, comprises a honeycomb-shaped base material on which an alumina $Al_2O_3$ carrier coating layer is formed. Silver oxide $Ag_2O$ is carried on the alumina carrier coating layer in a ratio of 0.2 mol of silver with respect to 200 g of alumina (lanthanum La may also be mixed in for improving the heat resistance).

As the method of preparation of such a catalyst, for example, alumina MI386 ($La/Al_2O_3$) powder: 1600 g, binder A520: 710.4 g, and water: 3600 g were stirred by an atritor for 20 minutes. The mixture was coated on the base material by 200 g/liter per unit volume. Next, this was fired in the air at 250° C. for 30 minutes, then fired at 500° C. for 1 hour so as to form an alumina carrier coating layer on the base material.

On the other hand, ion exchanged water was added to silver nitrate: 236.2 g to a volume of 1700 cc to dissolve it and prepare a silver nitrate aqueous solution with an Ag concentration of 0.82 mol/liter.

The above-mentioned alumina carrier coating layer was dipped in such a silver nitrate aqueous solution for 30 minutes. By being carried by adsorption, Ag: 0.2 mol/liter was carried per unit volume. Next, a blowing type dryer was activated to dry this for 20 minutes and fire it in the air at 550° C. for 3 hours, then this was fired at 500° C. for 3 hours while running nitrogen containing 5% of hydrogen at a rate of 7 liters per minute.

In such a prepared catalyst, as shown in FIG. 2(A), silver oxide $Ag_2O$ is exposed from the alumina $Al_2O_3$ carrier coating layer. The NO in the exhaust gas is oxidized to $NO_2$, then can be held well as silver nitrate $AgNO_3$. However, if the $NO_X$ catalyst device 2 becomes a high temperature of about 550° C. or more, as shown in FIG. 2(B), the silver Ag of the silver oxide $Ag_2O$ gradually ends up forming a solid solution in the alumina carrier coating layer, so the $NO_X$ adsorption ability of the $NO_X$ catalyst device 2 falls.

It is learned that such formation of a solid solution of silver Ag is reversed by supplying HC and CO or another reducing substance. That is, by supplying a reducing substance to the alumina carrier coating layer in which silver forms a solid solution as shown in FIG. 2(B), silver is again exposed as silver oxide from the alumina carrier coating layer as shown in FIG. 2(A) and the dropped $NO_X$ adsorption ability can be restored.

FIG. 3 is a flow chart for restoration of the $NO_X$ adsorption ability of the $NO_X$ catalyst device. The routine is executed in the electronic control unit every predetermined unit time.

First, at step 101, the current temperature of the exhaust gas which flows into the $NO_X$ catalyst device 2 is detected by a temperature sensor 5 as the current temperature T of the $NO_X$ catalyst device 2. Of course, it is also possible to use the current temperature of the exhaust gas which flows into the $NO_X$ catalyst device 2 and the previous temperature T' of the $NO_X$ catalyst device 2 as the basis to estimate the current temperature T of the $NO_X$ catalyst device 2. Further, it is also possible to use the current engine operating state (engine load and engine speed) and the previous temperature T' of the $NO_X$ catalyst device 2 as the basis to estimate the current temperature T of the $NO_X$ catalyst device 2.

Next, at step 102, it is judged if the current temperature T of the $NO_X$ catalyst device 2 is higher than the set temperature T1 (for example 550° C.). If the judgment is negative, the $NO_X$ adsorption ability of the $NO_X$ catalyst device 2 does not further fall in the period of the current unit time and the routine proceeds as is to step 104. However, when the current temperature T of the $NO_X$ catalyst device 2 is higher than the set temperature T1, the judgment at step 102 is positive. At step 103, the temperature difference $\Delta T$ (T-T1) between the current temperature T of the $NO_X$ catalyst device 2 and the set temperature T1 is cumulatively added to the cumulative value A, so the routine proceeds to step 104.

When the current temperature T of the $NO_X$ catalyst device 2 is higher than the set temperature T1, the $NO_X$ adsorption ability of the $NO_X$ catalyst device 2 falls. The amount of drop of the $NO_X$ adsorption ability of the $NO_X$ catalyst device 2 during the current unit time becomes larger the larger the temperature difference $\Delta T$ between the current temperature T of the $NO_X$ catalyst device 2 and the set temperature T1, that is, can be considered to correspond to the temperature difference $\Delta T$. Due to this, the cumulative value A obtained by cumulatively adding this temperature difference $\Delta T$ corresponds to the current amount of drop of the $NO_X$ adsorption ability of the $NO_X$ catalyst device 2.

Figure 4:
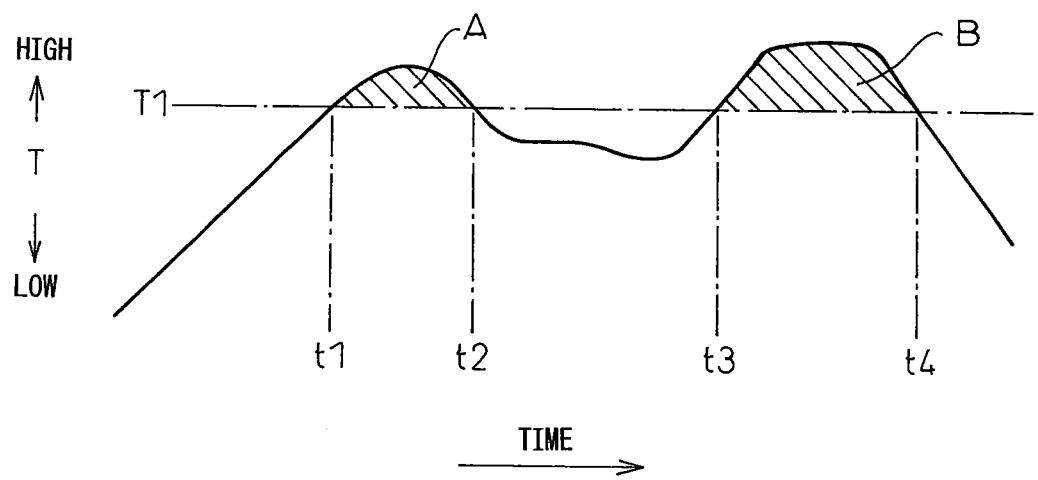
FIG. 4 is a time chart which shows an example of temperature changes of the $NO_X$ catalyst device.

FIG. 4 is a time chart illustrating the change of temperature of the $NO_X$ catalyst device 2 accompanying change of the engine operating state. In the period from the time t1 to t2 and the period from the time t3 to t4, the temperature T of the $NO_X$ catalyst device 2 becomes the set temperature T1 or more, the formation of the solid solution by the silver proceeds, and the $NO_X$ adsorption ability of the $NO_X$ catalyst device 2 gradually falls.

The amount of drop in the $NO_X$ adsorption ability of the $NO_X$ catalyst device 2 in the period from the time t1 to t2 can be considered to correspond to the area A shown by the hatching in FIG. 4 if making the unit time a very small time since the longer the time when the current temperature T of the $NO_X$ catalyst device 2 becomes the set temperature T1 or more, the more the formation of a solid solution by silver progresses and, further, in a unit time, the higher the current temperature T of the $NO_X$ catalyst device 2 from the set temperature T1, the more the silver forms a solid solution. Similarly, the amount of drop of the $NO_X$ adsorption ability of the $NO_X$ catalyst device 2 in the period from the time t3 to t4 can be considered to correspond to the area B which is shown by the hatching in FIG. 4.

Next, at step 104, it is judged if the cumulative value A of the temperature difference $\Delta T$ which corresponds to the amount of drop of the current $NO_X$ adsorption ability has become a set cumulative value A' or more. When the judgment is negative, the $NO_X$ adsorption ability of the $NO_X$ catalyst device 2 does not fall that much. Without wastefully consuming the fuel, at step 110, the flag F is made 0 and the routine ended.

On the other hand, if the cumulative value A of the temperature difference $\Delta T$ becomes the set cumulative value A', the judgment at step 104 is positive and the routine proceeds to step 105 where it is judged if processing is currently being performed to regenerate the particulate filter 3.

In the particulate filter 3, before a large amount of particulate is trapped and the exhaust resistance becomes extremely great, processing has to be performed to burn off the trapped particulate for regeneration. Such regeneration processing supplies additional fuel to the cylinders in the expansion stroke or exhaust stroke to make the exhaust gas of the lean air-fuel ratio contain a relatively large amount of unburned fuel and burns off the unburned fuel in the oxidation catalyst device 4 by using the sufficient amount of oxygen in the exhaust gas so as to raise the temperature of the exhaust gas which flows into the particulate filter 3 so as to burn off the trapped particulate. Here, the additional fuel may also be supplied to the exhaust passage 1 at the upstream side of the oxidation catalyst device 4.

Even if it is judged that the cumulative value A becomes the set cumulative value A' and the $NO_X$ adsorption ability of the $NO_X$ catalyst device 2 falls to the set ability, when processing is performed to regenerate the particulate filter 3, at step 111, the flag F is made "1" and the routine is ended without anything being done. However, when such regeneration is not performed, it is judged at step 106 if the flag F is "1" or not. If the flag F is 0, the judgment at step 106 is negative and first rich control is performed at step 107, while if the flag F is 1, the judgment at step 106 is positive and second rich control is performed at step 108.

The first rich control is control in a first set time period for making the combustion air-fuel ratio a predetermined first rich air-fuel ratio, supplying additional fuel to a cylinder in an expansion stroke or an exhaust stroke so as to make the air-fuel ratio of the exhaust gas the first rich air-fuel ratio, or supplying additional fuel to the exhaust passage 1 at the upstream side of the $NO_X$ catalyst device 2 to make the air-fuel ratio of the exhaust gas the first rich air-fuel ratio.

In this way, when it is judged that the cumulative value A has become the set cumulative value A' and the $NO_X$ adsorption ability of the $NO_X$ catalyst device 2 falls to the set ability, due to the first rich control, the air-fuel ratio of the exhaust gas which flows into the $NO_X$ catalyst device 2 is made the first rich air-fuel ratio and, in the $NO_X$ catalyst device 2, the HC and CO and other reducing substance which is contained in a relatively large amount in the exhaust gas acts on the alumina carrier coating layer to restore the silver from the solid solution state. As a result, the $NO_X$ adsorption ability of the $NO_X$ catalyst device 2 can be substantially completely restored.

On the other hand, the second rich control uses a similar method as the first rich control to make the air-fuel ratio of the exhaust gas which flows into the $NO_X$ catalyst device 2 a second rich air-fuel ratio smaller than the first rich air-fuel ratio in the first set time period, uses a similar method as the first rich control to make the air-fuel ratio of the exhaust gas which flows into the $NO_X$ catalyst device 2 the first rich air-fuel ratio in a second set time period longer than the first set time period, or uses a similar method as the first rich control to make the air-fuel ratio of the exhaust gas which flows into the $NO_X$ catalyst device 2 the second rich air-fuel ratio in the second set time period so that a greater amount of a reducing substance than the first rich control is supplied to the $NO_X$ catalyst device 2.

The second rich control is performed when the flag F becomes "1". That is, when it is judged that the cumulative value A becomes the set cumulative value A' and the $NO_X$ adsorption ability of the $NO_X$ catalyst device 2 falls to the set ability, the processing for regeneration of the particulate filter 3 is performed, so sometimes the exhaust gas cannot be made a rich air-fuel ratio and restoration of the $NO_X$ adsorption ability of the $NO_X$ catalyst device 2 is abandoned.

In this way, when the $NO_X$ adsorption ability of the $NO_X$ catalyst device 2 falls to the set ability, sometimes it is not possible to perform the first rich control due to other demands. When there are no longer other demands and when restoring the $NO_X$ adsorption ability of the $NO_X$ catalyst device 2, the second rich control is performed so that a greater amount of reducing substance than the first rich control flows into the $NO_X$ catalyst device 2 whereby the formation of a solid solution by silver proceeds and the $NO_X$ adsorption ability further falls from the set ability until making the air-fuel ratio of the exhaust gas which flows into the $NO_X$ catalyst device 2 rich, but due to the greater amount of reducing substance, a sufficient amount of silver is restored from the solid solution and the $NO_X$ adsorption ability can be sufficiently restored.

Here, the first set time period for performing the first rich control and the first rich air-fuel ratio of the first rich control are set so as to supply to the $NO_X$ catalyst device 2 the amount of reducing substance which is necessary for substantially completely restoring the $NO_X$ adsorption ability which fell to the set ability. Further, the longer the time period in which rich control cannot be performed due to other demands, the more the formation of a solid solution by silver progresses, so if making the second set time period of the second rich control longer or making the second rich air-fuel ratio of the second rich control smaller, the more the formation of a solid solution by silver progresses, the greater the amount of reducing substance is supplied to the $NO_X$ catalyst device 2. Due to the minimum extent of fuel consumption, it becomes possible to substantially completely restore the $NO_X$ adsorption ability which fell further from the set ability.

In this way, if the $NO_X$ adsorption ability of the $NO_X$ catalyst device 2 is substantially completely restored, at step 109, the cumulative value A which corresponds to the amount of drop of the current $NO_X$ adsorption ability of the $NO_X$ catalyst device 2 is reset to 0. At step 110, the flag F is made 0 and the routine is ended.

In the present embodiment, the current amount of drop of the $NO_X$ adsorption ability of the $NO_X$ catalyst device 2, as calculated at step 103, was made the cumulative value A of the temperature difference $\Delta T$ between the temperature T of the $NO_X$ catalyst device 2 every unit time and the set temperature T1 when the temperature difference $\Delta T$ is positive, but it is also possible to just use the total of the time when the temperature T of the $NO_X$ catalyst device 2 becomes the set temperature T1 or more as the current amount of drop of the $NO_X$ adsorption ability of the $NO_X$ catalyst device 2.

In this regard, in the present embodiment, if making the particulate filter 3 itself carry the oxidation catalyst, it is possible to eliminate the oxidation catalyst device 2.

List Of Reference Numerals
1 exhaust passage
2 $NO_X$ catalyst device
3 particulate filter
4 oxidation catalyst device
5 temperature sensor

The invention claimed is:

1. An exhaust purification system of an internal combustion engine, comprising:
   a silver-alumina based catalyst device arranged in an engine exhaust system; and
   an electronic control unit programmed to
      make the exhaust gas air-fuel ratio in said catalyst device rich so as to restore an $NO_X$ adsorption ability of said catalyst device when the $NO_X$ adsorption ability of said catalyst device becomes a set ability or less, and
      judge that the $NO_X$ adsorption ability of said catalyst device has fallen to said set ability when a cumulative value of a temperature difference between a temperature of said catalyst device for a unit time and a set temperature becomes a set cumulative value when said temperature difference is positive.

2. The exhaust purification system of an internal combustion engine as set forth in claim 1, wherein, when the $NO_X$ adsorption ability of said catalyst device has become said set ability and it is not possible to make an air-fuel ratio of exhaust gas which flows into said catalyst device rich at that time due to other demands, the electronic control unit is programmed to make a greater amount of reducing substance than a predetermined amount flow into said catalyst device when there are no longer other demands and make an air-fuel ratio of exhaust gas which flows into said catalyst device rich.

3. An exhaust purification system of an internal combustion engine, comprising:
   a silver-alumina based catalyst device arranged in an engine exhaust system; and
   an electronic control unit programmed to
      make the exhaust gas air-fuel ratio in said catalyst device rich so as to restore an $NO_X$ adsorption ability of said catalyst device when the $NO_X$ adsorption ability of said catalyst device becomes a set ability or less,
      detect a time length where a temperature of said catalyst device becomes a set temperature or more,
      sum up a time length so as to calculate a total of a time, and
      judge that the $NO_X$ adsorption ability of said catalyst device has fallen to said set ability when the total of the time becomes a set time.

4. The exhaust purification system of an internal combustion engine as set forth in claim 3, wherein, when the $NO_X$ adsorption ability of said catalyst device has become said set ability and it is not possible to make an air-fuel ratio of exhaust gas which flows into said catalyst device rich at that time due to other demands, the electronic control unit is programmed to make a greater amount of reducing substance than a predetermined amount flow into said catalyst device when there are no longer other demands and make an air-fuel ratio of exhaust gas which flows into said catalyst device rich.

\* \* \* \* \*